United States Patent
Choudhary et al.

(10) Patent No.: US 9,336,247 B2
(45) Date of Patent: *May 10, 2016

(54) CONTROL DATA DRIVEN MODIFICATIONS AND GENERATION OF NEW SCHEMA DURING RUNTIME OPERATIONS

(71) Applicant: International Business Machines Corporation, Armonk, NY (US)

(72) Inventors: Shruti Choudhary, Bangalore (IN); Jeff J. Li, Boca Raton, FL (US); Wendi L. Nusbickel, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/502,205

(22) Filed: Sep. 30, 2014

(65) Prior Publication Data

US 2015/0058279 A1 Feb. 26, 2015

Related U.S. Application Data

(63) Continuation of application No. 13/801,556, filed on Mar. 13, 2013.

(51) Int. Cl.
*G06F 17/30* (2006.01)

(52) U.S. Cl.
CPC .... *G06F 17/30292* (2013.01); *G06F 17/30563* (2013.01)

(58) Field of Classification Search
CPC ................................................ G06F 17/30563
See application file for complete search history.

(56) References Cited

U.S. PATENT DOCUMENTS

| | | | |
|---|---|---|---|
| 6,604,110 B1 | 8/2003 | Savage et al. | |
| 7,111,075 B2 | 9/2006 | Pankovcin et al. | |
| 7,694,287 B2 | 4/2010 | Singh et al. | |
| 7,720,873 B2 | 5/2010 | Loving et al. | |
| 7,730,450 B2 | 6/2010 | Mercer | |
| 7,849,049 B2 | 12/2010 | Langseth et al. | |
| 7,970,730 B2 | 6/2011 | Meijer et al. | |
| 8,024,369 B2 | 9/2011 | Pellegrini et al. | |
| 8,099,438 B2 | 1/2012 | Calahan | |
| 8,140,596 B2 | 3/2012 | Brown et al. | |
| 8,214,324 B2 | 7/2012 | Joerg et al. | |
| 2005/0187991 A1* | 8/2005 | Wilms et al. | 707/204 |
| 2005/0251533 A1 | 11/2005 | Harken et al. | |
| 2007/0055655 A1 | 3/2007 | Bernstein et al. | |
| 2007/0074155 A1 | 3/2007 | Ama et al. | |
| 2007/0136324 A1 | 6/2007 | Xu et al. | |
| 2008/0092037 A1 | 4/2008 | Medi et al. | |
| 2010/0189322 A1 | 7/2010 | Sakagawa | |

(Continued)

OTHER PUBLICATIONS

Office Action, dated Nov. 7, 2014, for U.S. Appl. No. 13/801,556, filed Mar. 13, 2013, invented by Shruti Choudhary et al., Total 28 pages.

(Continued)

*Primary Examiner* — Mohammad S Rostami
(74) *Attorney, Agent, or Firm* — Rabindranath Dutta; Konrad, Raynes, Davda and Victor LLP

(57) ABSTRACT

A computational device receives input data and control data, where the control data includes instructions to modify one or more operations performed during a runtime execution associated with the input data. The control data is processed to modify the one or more operations during the runtime execution associated of the input data.

6 Claims, 7 Drawing Sheets

(56) References Cited

U.S. PATENT DOCUMENTS

| | | | |
|---|---|---|---|
| 2010/0281061 A1 | 11/2010 | Chen | |
| 2011/0055147 A1* | 3/2011 | Joerg et al. | 707/602 |
| 2011/0219044 A1 | 9/2011 | Peukert | |
| 2011/0295865 A1 | 12/2011 | Carroll et al. | |
| 2011/0320926 A1 | 12/2011 | Agarwal et al. | |
| 2012/0054147 A1 | 3/2012 | Goetz et al. | |
| 2012/0310875 A1* | 12/2012 | Prahlad et al. | 707/602 |
| 2012/0323628 A1 | 12/2012 | Jaster et al. | |
| 2013/0179769 A1 | 7/2013 | Gurfinkel et al. | |
| 2013/0262496 A1* | 10/2013 | Wong | 707/758 |
| 2014/0108437 A1* | 4/2014 | Brown et al. | 707/755 |
| 2014/0188784 A1* | 7/2014 | Guerra | 707/602 |

OTHER PUBLICATIONS

Office Action, dated Dec. 29, 2014, for U.S. Appl. No. 13/801,524, filed Mar. 13, 2013, invented by Jeff J. Li et al., Total 30 pages.

Response to Office Action, dated Feb. 9, 2018, for U.S. Appl. No. 13/801,556 invented by Shruti Choudhay et al., Total 10 pages.

Response to Office Action, dated Mar. 30, 2015, for U.S. Appl. No. 13/801,524, filed Mar. 13, 2013, invented by J.J. Li et al. Total 9 pages.

Response to Final Office Action, dated Oct. 16, 2015, for U.S. Appl. No. 13/801,524, filed Mar. 13, 2013, invented by J.J. Li et al. Total 12 pages.

Notice of Allowance, dated Sep. 15, 2015, for U.S. Appl. No. 13/801,556, filed Mar. 13, 2013, invented by invented by Shruti Choudhary et al., Total 9 pages.

Final Office Action, dated Jul. 16, 2015, for U.S. Appl. No. 13/801,524, filed Mar. 13, 2013, invented by Jeff J. Li et al., Total 20 pages.

Office Action, dated May 4, 2015, for U.S. Appl. No. 14/501,955, filed Sep. 30, 2014, invented by Jeff J. Li et al., Total 35 pages.

Response to Office Action, dated Aug. 4, 2015, for U.S. Appl. No. 14/501,955, filed Sep. 30, 2014, invented by Jeff J. Li et al., Total 7 pages.

Final Office Action, dated Jun. 4, 2015, for U.S. Appl. No. 13/801,556, filed Mar. 13, 2013, invented by invented by Shruti Choudhary et al., Total 22 pages.

Response to Final Office Action, dated Sep. 4, 2015, for U.S. Appl. No. 13/801,556, filed Mar. 13, 2013, invented by invented by Shruti Choudhary et al., Total 15 pages.

Arnav, "Pentaho-kettle: Need to Create ETL Jobs Dynamically Based on User Input", [online], [Retrieved on Jan. 15, 2013]. Retrieved from the Internet at <URL: http://stackoverflow.com/questions/6610759/pentaho-kettle-need-to-create-etl-jobs-dynamically-based-on-user-input>, edited Jul. 21, 2011, Total 2 pp.

Bekwam, Inc., "Dynamic Schemas in Talend Open Studio", [online], [Retrieved on Feb. 11, 2013]. Retrieved from the Internet at <URL: http://bekwam.blogspot.com/2011/06/dynamics-schemas-in-talend-open-studio.html>, 2011 Berkwan, Inc., Jun. 22, 2011, Total 9 pp.

Wojciechowski, A., "E-ETL: Framework for Managing Evolving ETL Processes", CIKM 2011 Glasgow: PIKM'11—Proc. of the 2011 Workshop for Ph.D. Students in Information and Knowledge Management, Glasgow, Oct. 28, 2011, DOI: 10.1145/2065003.2065016, 2011 ACM, Total 7 pp.

U.S. Patent Application, filed Mar. 13, 2013, entitled "Output Driven Generation of a Conbined Schema from a Plurality of Input Data Schemas", invented by Choudhary, S., J.J. Li, and W.L. Nusbickel, Total 28 pp. [54.103 (Appln)].

US Patent Application, dated Mar. 13, 2013, for U.S. Appl. No. 13/801,556, filed Mar. 13, 2013, entitled "Control Data Driven Modifications and Generation of New Schema During Runtime Operations", invented by S. Choudhary et al., Total 26 pages.

Preliminary Amendment, dated Sep. 30, 2014, for U.S. Appl. No. 13/801,556, filed Mar. 13, 2013, entitled "Control Data Driven Modifications and Generation of New Schema During Runtime Operations", invented by S. Choudhary et al., Total 14 pages.

Office Action, dated Dec. 11, 2015, for U.S. Appl. No. 13/801,524 (54.103), filed Mar. 13, 2013, invented by J.J. Li et al., Total 18 pages.

Final Office Action, dated Dec. 4, 2015, for U.S. Appl. No. 14/501,955 (54.103C1) filed Sep. 30, 2014, invented by J.J. Li et al., Total 26 pages.

T. He, et al., "Build a Metadata-Driven ETL Platform by Extending Microsoft SQL Server Integration Services", dated Mar. 2008, Microsoft SQL Server 2008, SQL Server Technical Article, Total 16 pages.

Notice of Allowance, dated Jan. 25, 2016, for U.S. Appl. No. 13/801,556 (54.106) filed Mar. 3, 2013, invented by invented by Shruti Choudhary et al., Total 16 pages.

* cited by examiner

CONTROL DATA DRIVEN MODIFICATIONS AND GENERATION OF NEW SCHEMA DURING RUNTIME OPERATIONS

CROSS-REFERENCE TO RELATED APPLICATIONS

This application is a continuation of application Ser. No. 13/801,556 filed on Mar. 13, 2013, which is incorporated herein by reference in its entirety.

BACKGROUND

1. Field

The disclosure relates to a method, system, and computer program product for control data driven modifications and generation of new schema during runtime operations.

2. Background

An Extract, Transform and Load (ETL) job may be executed as a process to process data from various sources. During execution of the ETL job, data may be extracted from input sources and transformed to fit operational needs. The transformed data may be loaded into a target, such as a database.

A schema refers to the structure of data described in a notation that is supported by a database management system, an application, or an industry standard. For example, a schema may indicate the organization of a table used to represent data.

A runtime environment may implement operations for the execution of machine instructions of applications written in a programming language. ETL jobs may execute in a runtime environment.

Mechanisms for processing different schemas and mixed data may include the use of a graphical user interface to design one ETL job for each schema. That is, at job design time users may be provided with schemas that describe input and output data and may select from among the schemas for each ETL component for a job, so that at runtime the ETL job processes input data based on the schemas that were provided to and selected by the user for the job design prior to runtime. Such an approach may be applied for building data warehouse databases that are defined by a number of database tables with static schemas.

SUMMARY OF THE PREFERRED EMBODIMENTS

Provided are a method, system, and computer program product in which a computational device receives input data and control data, where the control data includes instructions to modify one or more operations performed during a runtime execution associated with the input data. The control data is processed to modify the one or more operations during the runtime execution associated with the input data.

In further embodiments, the control data includes a schema, and the input data is processed in accordance with the schema provided by the input data.

In yet further embodiments, a determination is made that for at least a portion of the input data no corresponding schema to process the portion of the input data has been received. A new schema is generated to process the portion of the input data for which no corresponding schema has been received.

In certain embodiments, the receiving and the processing is performed by an Extract Transform Load (ETL) component that executes in the computational device, where the ETL component extracts information from the input data and the control data, transforms the information in conformance with operational needs, and loads the transformed information to generate an output.

In additional embodiments, the control data provides a first instruction for modifying a first operation to be performed during the runtime execution, and no instructions are provided for modifying a second operation to be performed during the runtime execution. A modification is made to the first operation in accordance with the first instruction, during the runtime execution. The second operation is performed without any modification, during the runtime execution.

In certain embodiments, at least a plurality of data records in the input data are structured hierarchically.

In further embodiments, at least one schema associated with the input data changes over time.

In yet further embodiments, data records of the input data are parsed in accordance at least one schema and processed via an Extract Transform Load (ETL) job.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

Certain input sources for data may provide "mixed data" described by different formats and schemas. For example a social network service may provide an input source that provides mixed data for an ETL job. Examples of data formats used by a social network service may include extensible markup language (XML) and JavaScript* Object Notation (JSON). Some portions of the mixed data may be described by a schema, and whereas some other portions, such as those provided in the JSON format, may not have any associated schema.

*JavaScript is a trademark or registered trademark of Oracle and/or its affiliates.

Extracting information from mixed data may require the creation of multiple ETL jobs. One ETL job may have to be targeted to one schema. Customers may have to create a plurality of ETL jobs, which may be time consuming. Furthermore, ETL jobs may not be able to handle dynamically changing data requirements, such as those seen in social networks. If customers change a schema, the ETL job created for the schema has to be updated and recompiled. For the data without a schema, customers may have to provide a schema or a schema has to be generated from sample data, such that the customer can create an ETL job to process the data.

A similar issue may arise in quality assurance. For a particular ETL job, a quality assurance program may need to test the ETL job with various data described by different schemas, to make sure the ETL job behaves as expected. For different schemas, different ETL jobs have to be designed to accomplish the perform testing tasks. If new design changes are made, the quality assurance program may need to change many ETL jobs one at a time, which is very inefficient.

Certain embodiments provide a mechanism for creating an ETL processor (i.e., an ETL job) that can adjust to both schema changes and data changes at runtime.

EMBODIMENTS

Figure 1:
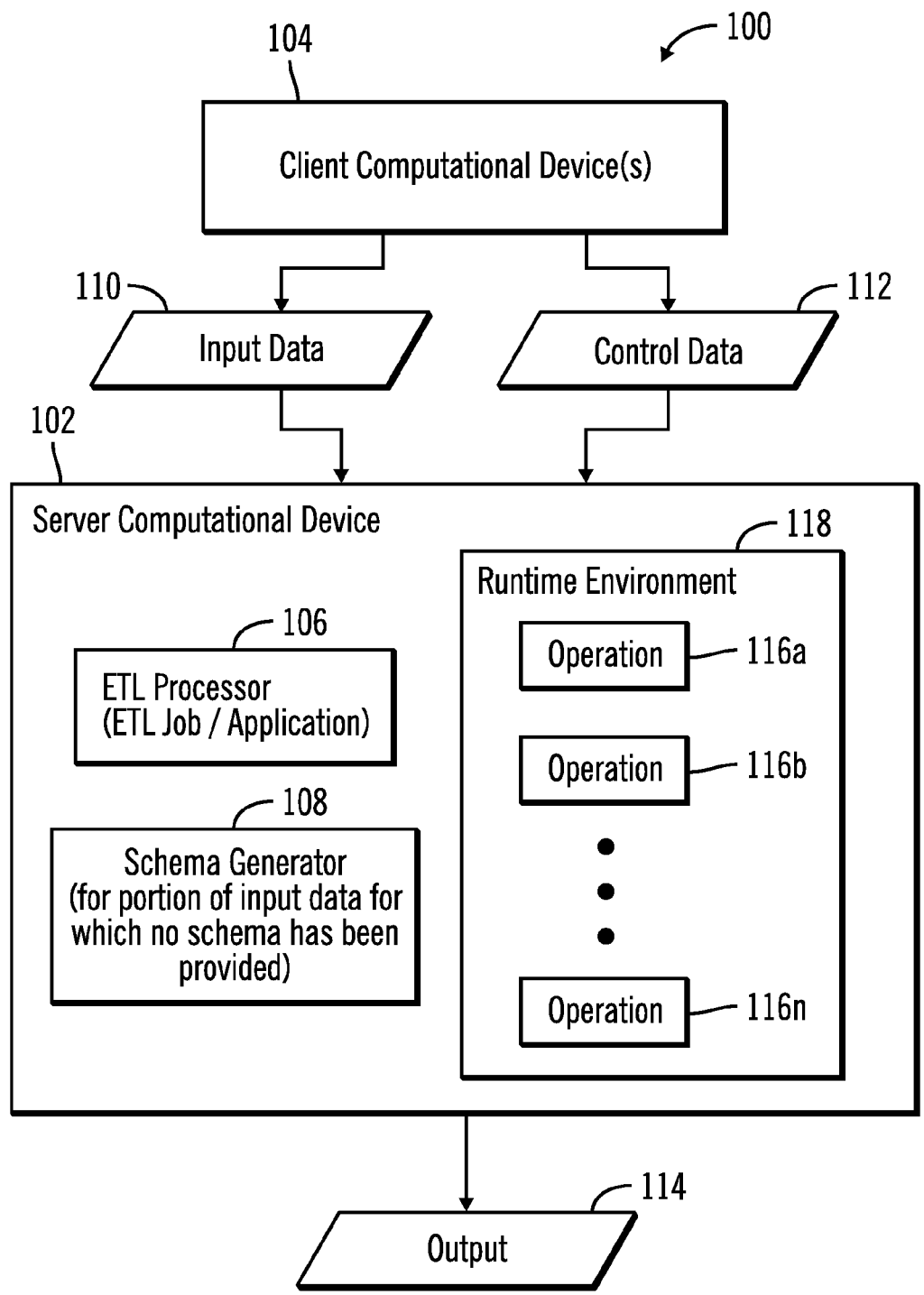
FIG. 1 illustrates a block diagram of a computing environment that includes a server computational device coupled to one or more client computational devices, in accordance with certain embodiments.

FIG. 1 illustrates a block diagram of a computing environment 100 that includes a server computational device 102 coupled to one or more client computational devices 104, in accordance with certain embodiments.

The server computational device 102 and the client computational device 104 may comprise any suitable computational device including those presently known in the art, such as, a personal computer, a workstation, a server, a mainframe, a hand held computer, a palm top computer, a telephony device, a network appliance, a blade computer, a storage server, a database server, etc. In certain embodiments, the server computational device 102 and the client computational device 104 may be coupled via a network, such as the Internet, an intranet, a storage area network, a local area network, etc. In other embodiments, the server computational device 102 and the client computational device 104 may refer to the same computational device.

The server computational device 102 includes an ETL processor 106 and a schema generator 108. The ETL processor 106 and the schema generator 108 are applications that may be implemented in software, firmware, hardware or any combination thereof.

The ETL processor 106 (i.e., an ETL job) may include many operations (i.e., steps), and exemplary operations 116a, 116b ... 116n of the ETL processor as executed in a runtime environment 118 are shown in FIG. 1. Each operation of the ETL processor 106 receives inputs from other operations or from the input data 110. Associated with each operation are one or more associated schemas that describe the inputs and outputs for the operation.

Exemplary operations 116a, 116b, ..., 116n of the ETL processor 106 receive input data 110 and control data 112, from the client computational device 104, for processing and generating an output 114, by transforming the input data 110. An exemplary operation of the ETL processor 106 (such as operation 116a) may also be referred to as an ETL component, where the ETL component extracts information from the input data and the control data, transforms the information in conformance with operational needs, and loads the transformed information to generate an output.

The schema generator 108 included in the server computational device 102 may generate a schema for a portion of the input data 110 for which the client computational device 104 has not provided a schema. The schemas generated by the schema generator 108 may be used as a part of the input schemas for operations 116a, 116b, ..., 116n.

FIG. 1 illustrates certain embodiments in which exemplary operations 116a, 116b, ..., 116n of the ETL processor 106 process the input data 110 based on information provided by the control data 112, where both the input data 110 and the control data 112 are provided by the client computational device 104. In certain embodiments, at least a plurality of data records in the input data 100 are structured hierarchically. In further embodiments, at least one schema associated with the input data 110 changes over time. In further embodiments, data records of the input data 110 are parsed by the exemplary operations 116a, 116b, ..., 116n of the ETL processor 106.

Figure 2:
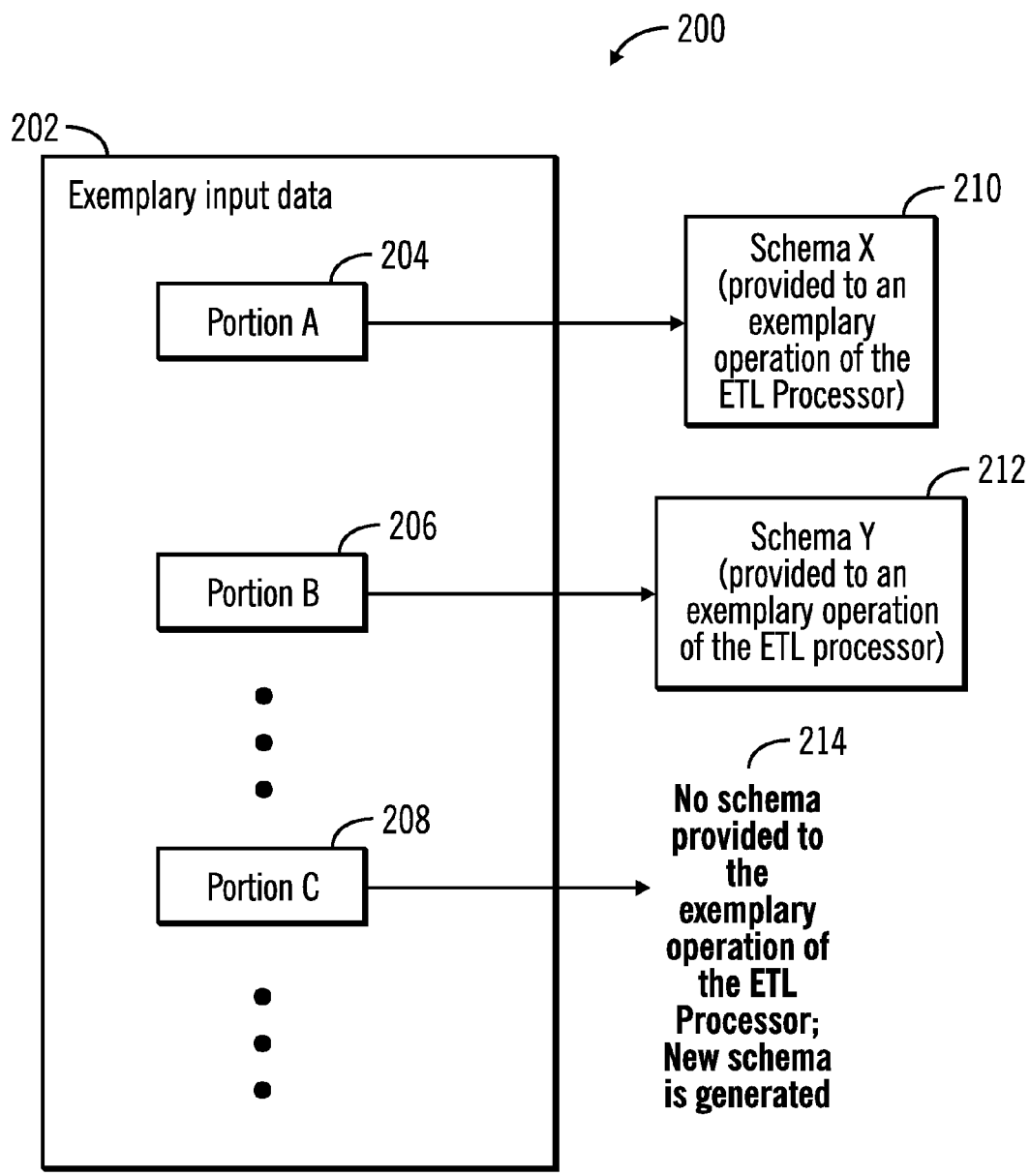
FIG. 2 illustrates a block diagram that shows exemplary input data received by an exemplary operation of an ETL processor that executes in the server computational device, in accordance with certain embodiments.

FIG. 2 illustrates a block diagram 200 that shows exemplary input data 202 received by exemplary operations 116a, 116b, ..., 116n of the ETL processor 106 executing in the server computational device 102, in accordance with certain embodiments. The exemplary input data 202 may be generated by the client computational device 104 and transmitted to the server computational device 102.

In certain embodiments, the exemplary input data 202 may include a plurality of portions of data, and in FIG. 2, three exemplary portions referred to as portion A (reference numeral 204), portion B (reference numeral 206), and portion C (reference numeral 208) have been shown. For example, portion A 204 may be the first ten thousand data records of mixed data provided by a social network, portion B 206 may be the next twenty thousand data records of the mixed data provided by the social network, and portion C 208 may be next ten thousand data records of the mixed data provided by the social network.

In certain embodiments, the client computational device 104 provides Schema X 210 to exemplary operations 116a, 116b, ..., 116n of the ETL processor 106 for interpreting portion A 204 of the exemplary input data 202. The client computational device 104 provides Schema Y 212 to the exemplary operations 116a, 116b, ..., 116n of the ETL processor 106 for interpreting portion B 206 of the exemplary input data 202. However, the client computational device 104 does not provide any schema to the exemplary operations 116a, 116b, ..., 116n of the ETL processor 106 for interpreting portion C of the exemplary input data 202. In such embodiments, the schema generator 108 is used to generate new schemas for portion C 202 of the exemplary input data, and the exemplary operations 116a, 116b, ..., 116n of the ETL processor 106 interprets portion C 208 in accordance with the new schemas. Portion A 204 and portion B 206 are interpreted in accordance with schema X 210 and schema Y 212 respectively. Such schemas may be generated in many situations, including situations in which the data stored in portion C 208 is hierarchically arranged.

Therefore, FIG. 2 illustrates certain embodiments in which if a client computational device does not provide a schema for a portion of the input data 202, then a new schema is generated by using the schema generator 108 to interpret the portion of the input data 202 for which no schema has been provided.

Figure 3:
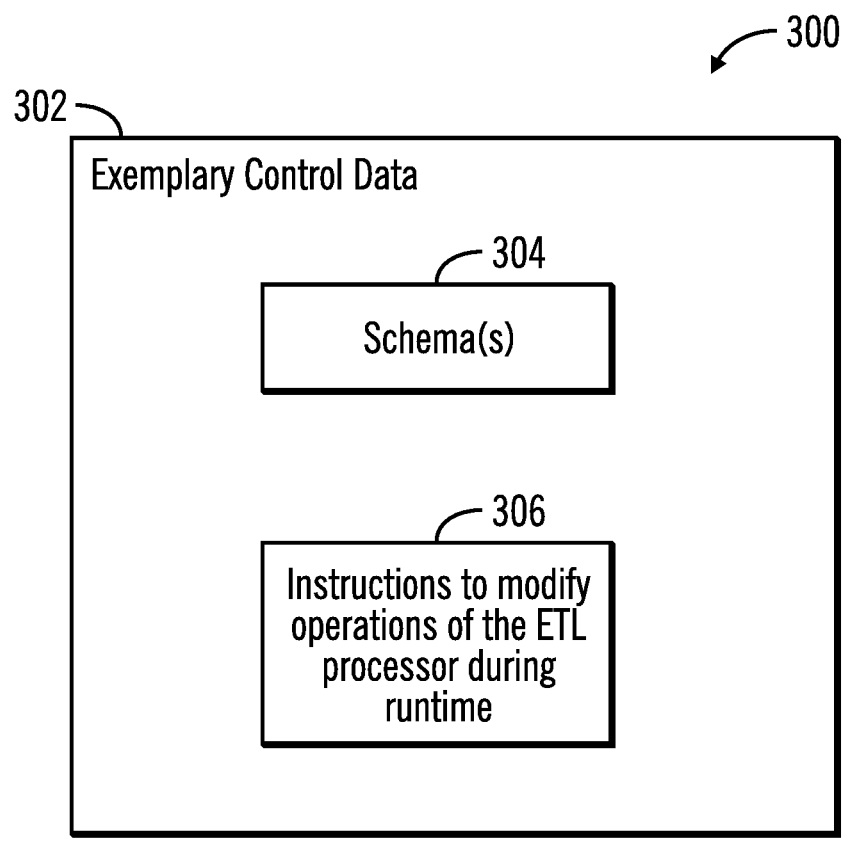
FIG. 3 illustrates a block diagram that shows exemplary control data with one or more schemas and instructions received by an exemplary operation of the ETL processor that executes in the server computational device, in accordance with certain embodiments.

FIG. 3 illustrates a block diagram 300 that shows exemplary control data 302 with one or more schemas 304 and instructions 306. The control data 302 is sent associated with the input data 110, from the client computational device 104 to the server computational device 102.

The instructions 306 include indications to modify exemplary operations of the ETL processor 106 during runtime. The exemplary control data 302 is received by the server computational device 102 from the client computational device 104, and the exemplary operations 116a ... 116n of the ETL processor 106 for processing the input data in the runtime environment 118 may be altered based on the instructions 306 included in the exemplary control data 302.

Figure 4:
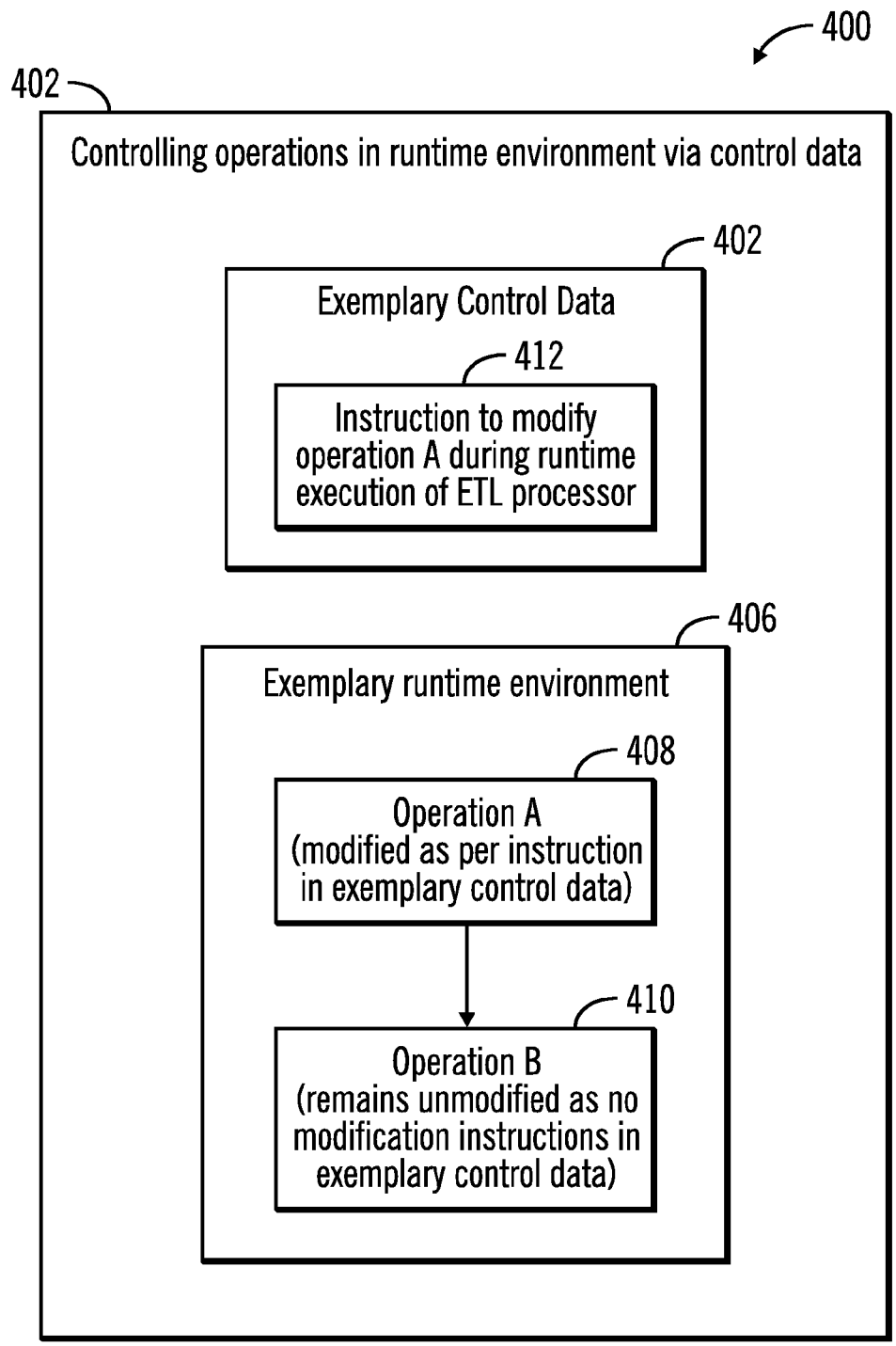
FIG. 4 illustrates a block diagram that shows exemplary control data that controls operations in a runtime environment, in accordance with certain embodiments.

FIG. 4 illustrates a block diagram 400 that shows exemplary control data 404 that controls operations in a runtime environment 406, in accordance with certain embodiments (as shown via reference numeral 402).

Two exemplary operations, referred to as Operation A 408 and Operation B 410 are shown in the exemplary runtime environment 406. The exemplary control data 404 includes an instruction 412 to modify operation A 408 in the runtime environment 406. As a result, operation A 408 is modified as per instruction 412 in the exemplary control data 404, and operation B 410 remains unmodified as no modification instruction for operation B 410 is found in the control data 404.

Figure 5:
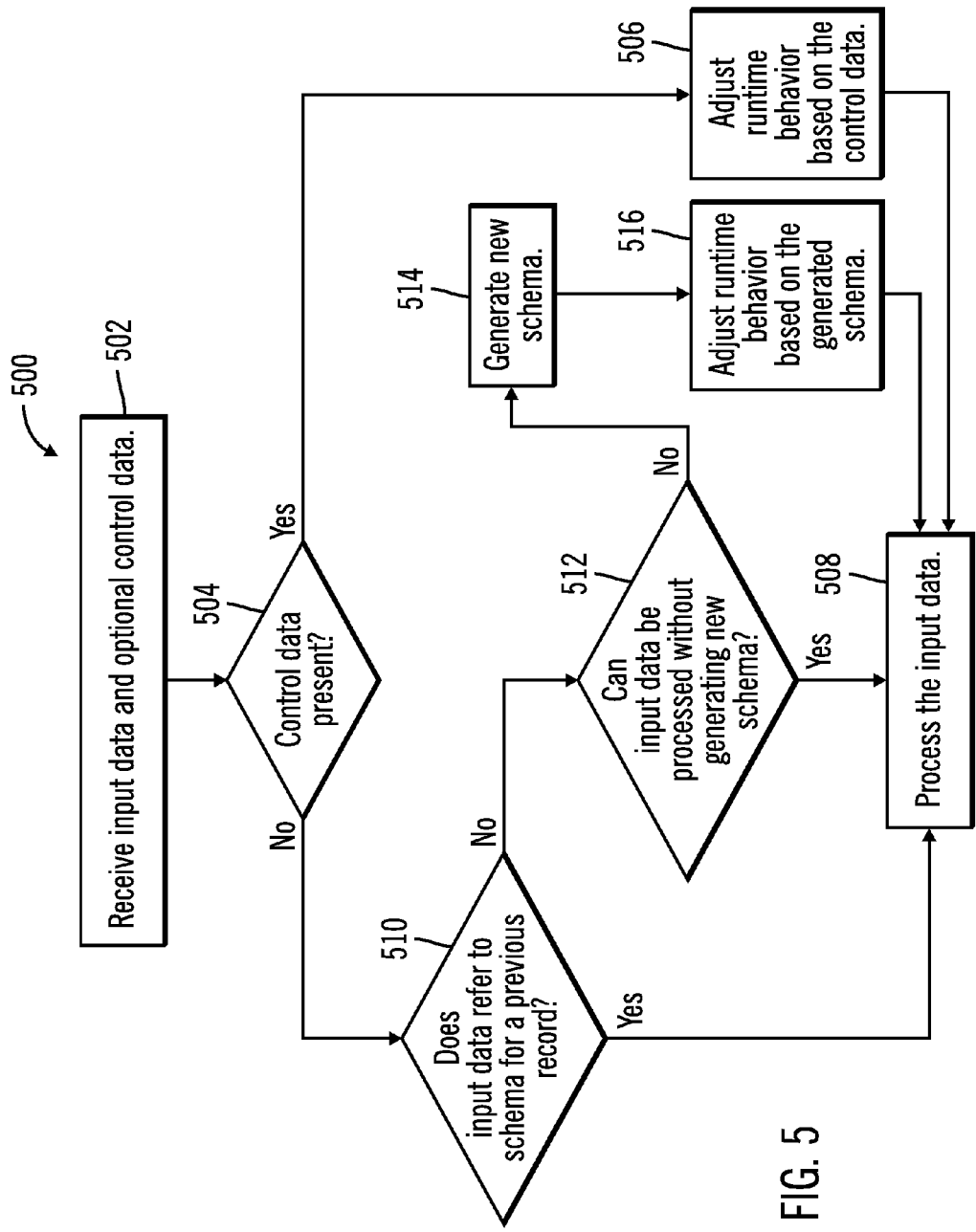
FIG. 5 illustrates a first flowchart that shows operations performed in the server computational device, in accordance with certain embodiments.

FIG. 5 illustrates a first flowchart 500 that shows operations performed by the ETL processor 106 executing in the server computational device 102, i.e., at runtime, in accordance with certain embodiments.

Control starts at block 502 in which an exemplary operation 116a receives input data from other operations or as part of the input data 110, and optional control data for the exemplary operation 116a as defined in the control data 112. The operation 116a determines (at block 504) whether control data for operation 116a is present. If so ("yes" branch from block 504), then control proceeds to block 506 in which the runtime behavior is adjusted (at block 514) based on the control data 112. Control proceeds to block 508 and the input data is processed in the runtime environment 118.

If at block 504 it is determined that control data is not present, then control proceeds to block 510 ("no" branch from block 504) in which a determination is made as to whether the input data refers to a schema for a previously processed data record. If so, then the schema is available and the exemplary operation 116a processes (at block 508) the input data for the exemplary operation 116a in accordance with the schema. If not ("no" branch from block 510), a determination is made (at block 512) as to whether the input data for the exemplary operation 116a can be processed without generating a new schema. If so, then the input data is processed (at block 508) with an earlier provided schema.

If at block 512 a determination is made that the input data for the exemplary operation 116a cannot be processed without generating a new schema ("no" branch from block 512) control proceeds to block 514 at which a new schema is generated. Control proceeds to block 516 where the runtime behavior is adjusted based on the generated schema, and the input data is processed (at block 508).

Figure 6:
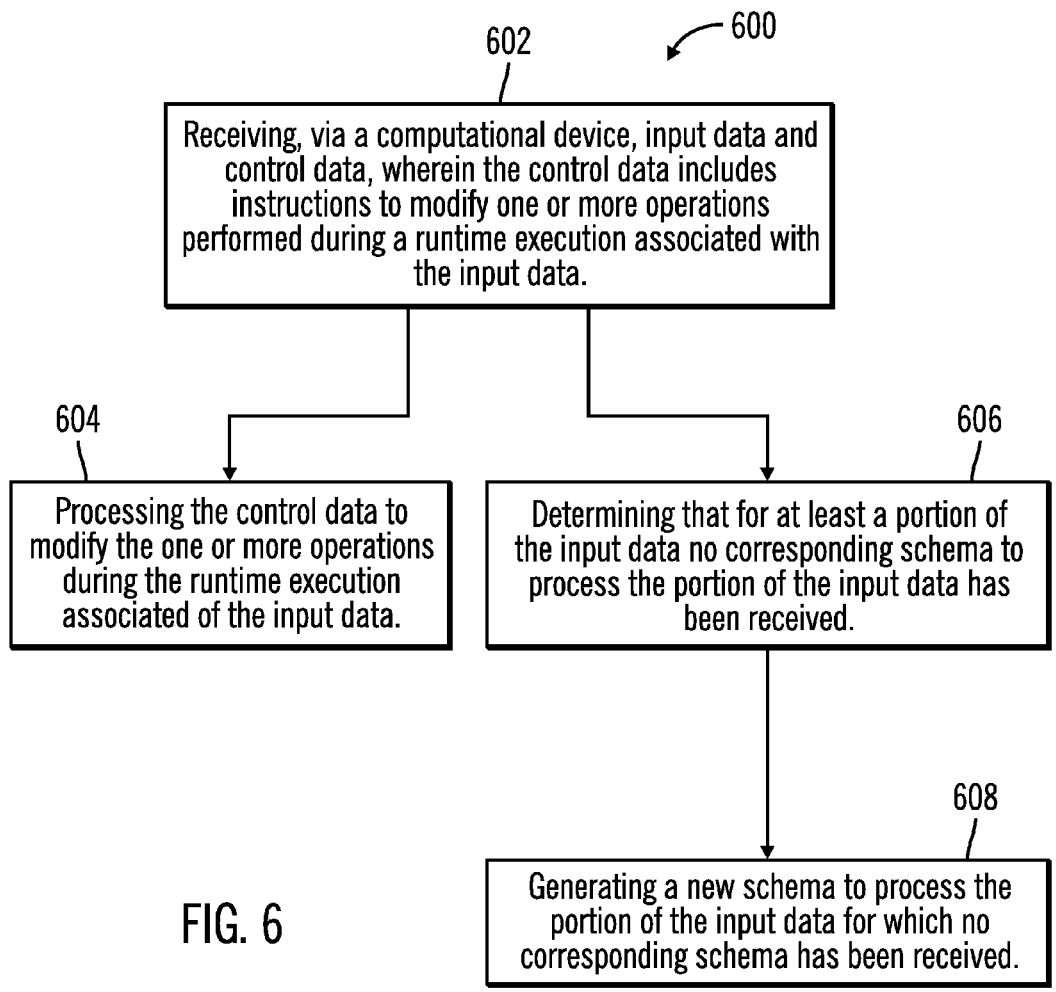
FIG. 6 illustrates a second flowchart that shows operations performed in the server computational device, in accordance with certain embodiments.

FIG. 6 illustrates a second flowchart 600 that shows operations performed in the server computational device 102, in accordance with certain embodiments.

Control starts at block 602 in which an exemplary operation 116a that executes in the runtime environment of a computational device (e.g., the server computational device 102) receives input data that may correspond to part of the input data 110. The exemplary operation 116a may also receive control data, where the control data may include instructions to modify the exemplary operation 116a during a runtime execution associated with the input data 110. The control data is processed (at block 604) to modify the exemplary operation 116a during the runtime execution associated with the input data 110.

In certain embodiments, the control data includes a schema, and the input data 110 is processed in accordance with the schema provided by the input data.

From block 602, control may proceed in parallel with the execution of block 604 to block 606, where in block 606 a determination is made that for at least a portion of the input data 110 no corresponding schema to process the portion of the input data has been received. A new schema is generated (at block 608) to process the portion of the input data for which no corresponding schema has been received.

Therefore, FIGS. 1-6 illustrate certain embodiments in which control data may be provided in association with input data to modify the operations performed by an ETL processor during runtime. Additionally, each operation is able to generate a schema for an input data for the operation, if the input data for the operation does not have any associated schema.

Further Embodiments

In an exemplary "parser job" comprising an XML parser that parses XML data based on the state machine generated from an XML schema, it may be desirable for the XML parser to build a new state machine if it encounters a new schema, so that the XML parser may validate and process the XML data against new schema. In this way, customers may need to design one parser job to process the XML "mixed data" described by different XML schemas.

Certain embodiments provide the ability to have a single ETL job that handles mixed data with different schemas or no schema, versus the method of creating one ETL job for each data type and schema. Time is saved for users by reducing the number of ETL jobs to be created and maintained. In certain embodiments, a general template may be used to define what can be dynamically set at runtime. For example, for the XML parser, the parser can be dynamically configured with a different XML schema at runtime. For the output step, the step can be dynamically configured with a different output schema, and so on. At runtime, input data is read from an input source. Optional control data that contains new schemas and other configurable parameters and values to adjust the runtime behavior of each step in the job are made available. In this manner, the schema is defined or adjusted from the incoming data. When each step receives the input, the step adjusts itself based on the control data for the step within the input as follows:

1. If there is no control data for the step and the real data refers to a schema used in previous input, the step keeps the same runtime behavior;
2. If there is no control data for the step and the real data does not refer to any schema, the step can either process the raw data directly without using a schema or generate a schema from the data before processing the real data;
3. If there is control data for the step, the step adjusts itself based on the new control data. In the XML parser case, the parser will generate a new state machine based on the new XML schema to validate and parse the incoming data. In the output step case, the output step is reconfigured to extract the data fields defined by the new output schema. A cache algorithm can be added to map the control data to loadable software modules or packages so that the step can switch between one behavior to another efficiently; and
4. After the step processes the control data in a record, the step process the real data in the record.

Referring to the examples above one application of certain embodiments is to have one simple job design to process a stream of mixed data from social networks defined by different schemas or by no schema. This results in increased flexibility for ETL jobs in a social networking environment. Jobs that may potentially cause an error with a data or format change may now continue to function. Additionally, quality assurance engineers may be able use one simple job to test various testing scenarios. Quality assurance engineers can focus on defining the testing scenarios rather than spending time on using the product to design jobs. This may result in a significant saving of time in the quality assurance process.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
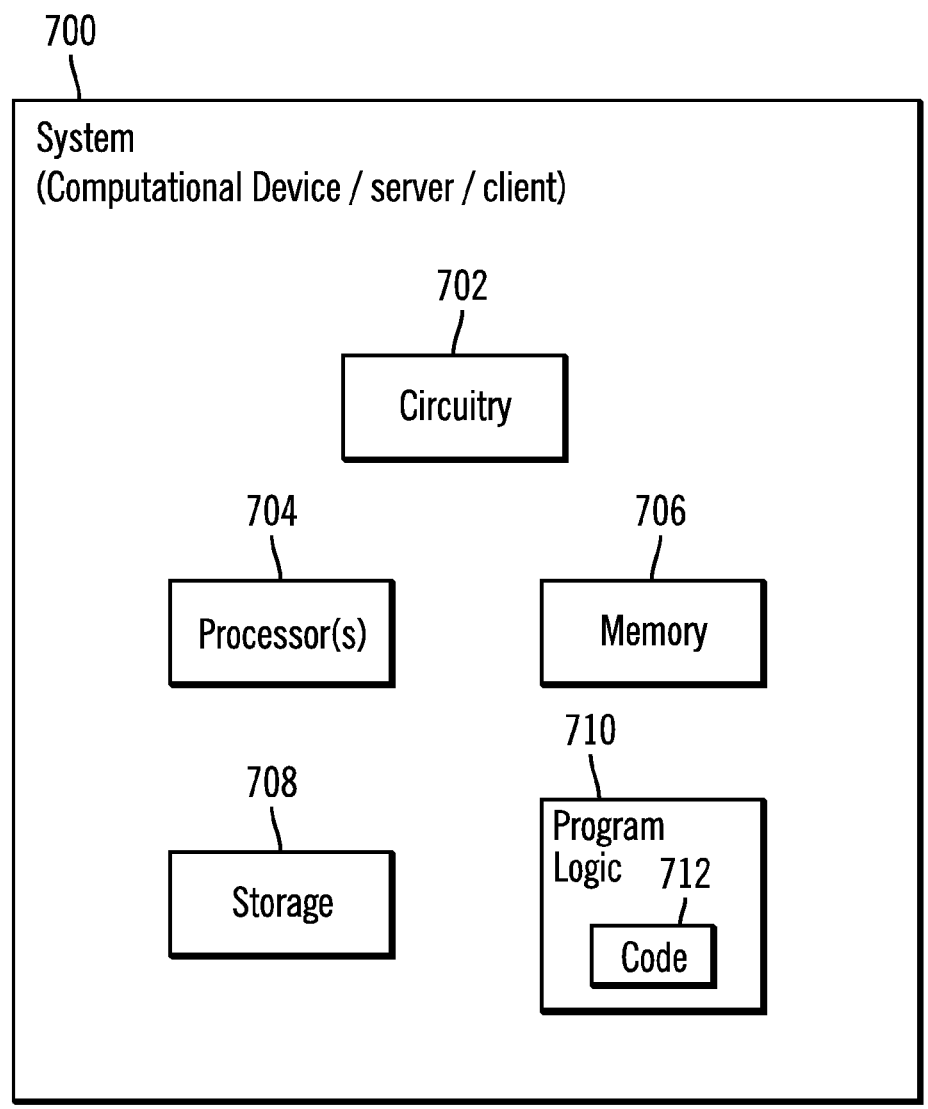
FIG. 7 illustrates a block diagram of a computational system that shows certain elements that may be included in at least the server computational device that executes operations of the ETL processor, and the client computational device of FIG. 1, in accordance with certain embodiments.

FIG. 7 illustrates a block diagram that shows certain elements that may be included in the server computational device 102, and the one or more client computational devices 104, in accordance with certain embodiments. The system 700 may comprise the server computational device 102 and may include a circuitry 702 that may in certain embodiments include at least a processor 704. The system 700 may also include a memory 706 (e.g., a volatile memory device), and storage 708. The storage 708 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 708 may comprise an internal storage device, an attached storage device and/or a network accessible storage device. The system 700 may include a program logic 710 including code 712 that may be loaded into the memory 706 and executed by the processor 704 or circuitry 702. In certain embodiments, the program logic 710 including code 712 may be stored in the storage 708. In certain other embodiments, the program logic 710 may be implemented in the circuitry 702. Therefore, while FIG. 7 shows the program logic 710 separately from the other elements, the program logic 710 may be implemented in the memory 706 and/or the circuitry 702.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:

receiving, via a computational device, input data and control data, wherein the control data includes instructions to modify one or more operations performed during a runtime execution associated with the input data;

processing the control data to modify the one or more operations during the runtime execution associated with the input data; and in response to determining that for at least a portion of the input data no corresponding schema to process the portion of the input data has been received, wherein the input data does not refer to a schema for a previous record, and in response to determining that the input data cannot be processed without generating one new schema, generating a new schema to process the portion of the input data for which no corresponding schema has been received, wherein the control data provides a first instruction for modifying a first operation to be performed during the runtime execution, and no instructions are provided for modifying a second operation to be performed during the runtime execution, the operations further comprising:

modifying the first operation in accordance with the first instruction during the runtime execution; and performing the second operation without any modification during the runtime execution.

2. The method of claim 1, wherein the control data includes a schema, the method further comprising:

processing the input data in accordance with the schema provided by the input data.

3. The method of claim 1, wherein the receiving and the processing is performed by an Extract Transform Load (ETL) component that executes in the computational device, and wherein the ETL component extracts information from the input data and the control data, transforms the information in conformance with operational needs, and loads the transformed information to generate an output.

4. The method of claim 1, wherein at least a plurality of data records in the input data are structured hierarchically.

5. The method of claim 1, wherein at least one schema associated with the input data changes over time.

6. The method of claim 1, the method further comprising:

parsing data records of the input data in accordance at least one schema; and processing the parsed data records via an Extract Transform Load (ETL) job that executes in the computational device.

* * * * *